(12) United States Patent
Ojima

(10) Patent No.: US 7,647,341 B2
(45) Date of Patent: Jan. 12, 2010

(54) MAP EDITING-AND-DISPLAYING APPARATUS, MAP MANAGING SYSTEM, MAP MANAGING METHOD, AND MAP STORING MEDIUM

(75) Inventor: Yasuo Ojima, Yokohama (JP)

(73) Assignee: Panasonic Corporation, Osaka (JP)

( * ) Notice: Subject to any disclaimer, the term of this patent is extended or adjusted under 35 U.S.C. 154(b) by 313 days.

(21) Appl. No.: 10/423,639

(22) Filed: Apr. 25, 2003

(65) Prior Publication Data

US 2003/0204520 A1 Oct. 30, 2003

(30) Foreign Application Priority Data

Apr. 26, 2002 (JP) .................. P. 2002-126248

(51) Int. Cl.
  G06F 7/00 (2006.01)
  G06F 17/00 (2006.01)
  G01C 21/30 (2006.01)
  G01C 21/32 (2006.01)

(52) U.S. Cl. .................. 707/104.1; 701/208

(58) Field of Classification Search .................. 701/200, 701/212, 208; 340/995.15; 703/2; 704/236; 715/885

See application file for complete search history.

(56) References Cited

U.S. PATENT DOCUMENTS

| | | | |
|---|---|---|---|
| 4,675,676 A * | 6/1987 | Takanabe et al. ....... | 340/995.15 |
| 4,737,927 A | 4/1988 | Hanabusa et al. | |
| 5,383,128 A | 1/1995 | Nishida et al. | |
| 5,445,524 A | 8/1995 | Jones | |
| 5,635,953 A * | 6/1997 | Hayami et al. .............. | 715/855 |
| 5,864,337 A | 1/1999 | Marvin | |
| 6,049,755 A | 4/2000 | Lou et al. | |
| 6,061,003 A * | 5/2000 | Harada ................... | 340/995.15 |
| 6,075,467 A * | 6/2000 | Ninagawa .............. | 340/995.14 |
| 6,240,361 B1 * | 5/2001 | Ise et al. ..................... | 701/208 |
| 6,587,787 B1 * | 7/2003 | Yokota ........................ | 701/212 |
| 6,636,802 B1 * | 10/2003 | Nakano et al. .............. | 701/208 |
| 6,718,304 B1 * | 4/2004 | Tachimori et al. ........... | 704/236 |
| 6,999,079 B2 * | 2/2006 | Kida .......................... | 345/427 |
| 7,171,626 B2 * | 1/2007 | Sheldon et al. ............. | 715/810 |
| 2001/0034588 A1 * | 10/2001 | Agrawals et al. ............... | 703/2 |
| 2003/0009458 A1 * | 1/2003 | Nakano et al. .................. | 707/6 |
| 2003/0036842 A1 * | 2/2003 | Hancock ..................... | 701/200 |
| 2004/0117109 A1 * | 6/2004 | Kodani et al. ............... | 701/200 |

FOREIGN PATENT DOCUMENTS

JP  4-46379  2/1992
JP  05-224598  9/1993

(Continued)

OTHER PUBLICATIONS

Japanese Office Action Dated Mar. 7, 2007.

*Primary Examiner*—Charles Rones
*Assistant Examiner*—Charles D Adams
(74) *Attorney, Agent, or Firm*—Pearne & Gordon LLP

(57) ABSTRACT

Provided is a map editing-and-displaying system that acquires partial map data from a database that contains map data. The partial map data includes appended index data. The system automatically assigns a map name to the partial map data based on the appended index data. A user can then identify and select the map according to the assigned map name.

3 Claims, 4 Drawing Sheets

FOREIGN PATENT DOCUMENTS

| | | |
|---|---|---|
| JP | 07-056505 | 3/1995 |
| JP | 07-325543 | 12/1995 |
| JP | 11-232433 | 8/1999 |
| JP | 11-257975 | 9/1999 |
| JP | 2000-230833 | 8/2000 |
| JP | 2000-241183 | 9/2000 |
| JP | 2001-041762 | 2/2001 |
| JP | 2001-157098 | 6/2001 |
| JP | 2001-266168 | 9/2001 |
| WO | 00/31663 | 6/2000 |

* cited by examiner

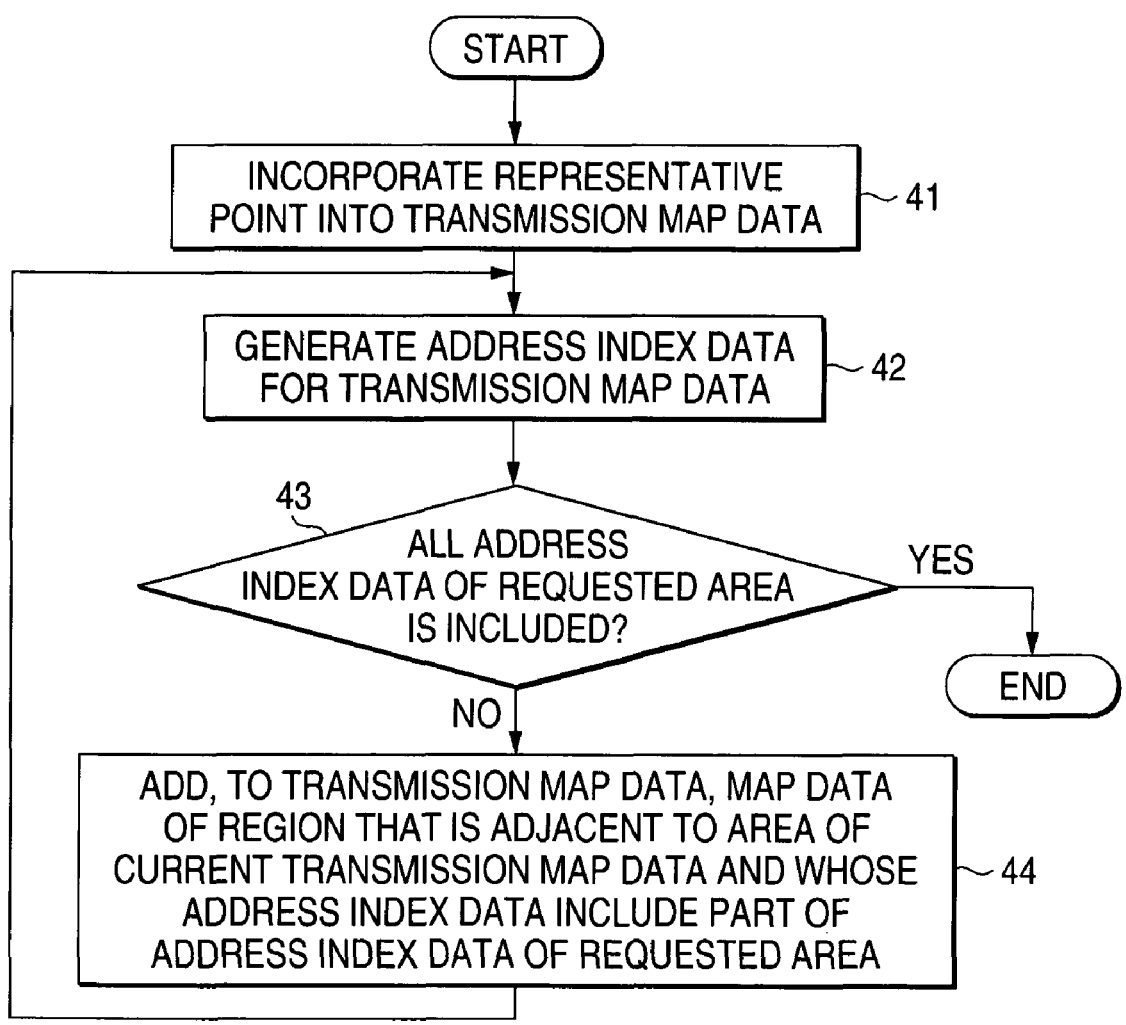

MAP EDITING-AND-DISPLAYING APPARATUS, MAP MANAGING SYSTEM, MAP MANAGING METHOD, AND MAP STORING MEDIUM

BACKGROUND OF THE INVENTION

The present invention relates to a map editing-and-displaying apparatus, a map managing system, a map managing method, and a map storing medium. In particular, the invention relates to a map editing-and-displaying apparatus, a map managing system, a map managing method, and a map storing medium that are used as or for a vehicular navigation apparatus etc.

Vehicular navigation apparatuses as map editing-and-displaying apparatuses will be described below. JP-A-46379/1992 discloses a conventional vehicular navigation apparatus as a map editing-and-displaying apparatus that is equipped with means for receiving, by radio, latest map data of an area requested by a user. The navigation apparatus disclosed in this publication is to display a road map taking latest road information into consideration. A navigation apparatus aboard an automobile or the like sends out a signal for requesting a road map of an area where the automobile exists. The navigation apparatus receives and stores roadmap information that is transmitted as a radio signal, and corrects pre-stored roadmap information using the thus-received roadmap information. In this manner, a road map is always displayed on the basis of latest information.

JP-A-232433/1999 discloses an apparatus in which access states of respective map-data-acquired areas are managed and map data of areas that are used at low frequencies can be erased. A map display control system disclosed in this publication is intended to reduce the amount of data to be handled by a server and to increase an initial map display speed and a map display speed at the time of such a manipulation as movement, enlargement, and reduction. A client terminal is connected to a server having a map database via a communication channel. The server manages the map database on a data area basis and a data type basis using mesh layer index information. In response to a map data request from the client terminal, the server extracts map data from the map database and sends the extracted map data to the client terminal. On the basis of a map display request, the client terminal determines a data area and a data type of a map data request range. The client terminal sends a map data request to the server on a data area basis and a data type basis. The client terminal stores, in a storing means, map data that are transmitted from the server. The client terminal manages data areas and data types and displays a map on a display device.

However, in the conventional map editing-and-displaying apparatuses, only such information as a code indicating an area and an acquisition date and time are appended to acquired map data. A map can be identified only by using a list of such information or displaying the map actually. However, a user of a vehicular navigation apparatus may not be familiar with maps, and it is very difficult for such a user to identify a desired map from a list of maps being stored. The case that map data are acquired on an area basis is associated with another problem that it takes long time to select an area while looking at a map and it is very difficult for a person who is not familiar with maps to acquire a necessary map.

SUMMARY OF THE INVENTION

The present invention has been made to solve the above problems in the art, and an object of the invention is therefore to provide a map editing-and-displaying apparatus that automatically assigns a map name to acquired map data in accordance with the range of their area and thereby allows a user to easily identify a map in a state that a list of maps being stored is displayed or in deleting the map. Another object of the invention is to provide a map editing-and-displaying apparatus that can acquire map data on an area basis, more specifically, on a prefecture/state basis or a city/town/village basis, or a like manner, and thereby allows a user who is not familiar with maps to acquire a map without the need for making a complicated area decision.

To solve the above problems, a map editing-and-displaying apparatus according to the invention comprises map data acquiring means for acquiring partial map data from a map database; map data storing means for storing map data; and map name assigning means for assigning a map name to the partial map data on the basis of index data that are appended to the partial map data. With this configuration, even a user who is not familiar with maps can easily recognize an area of acquired map data and time of their acquisition and can easily delete an unnecessary map.

A map managing system according to the invention has a center that is provided with a map database containing map data and a map editing-and-displaying apparatus that edits and utilizes part of the map data, wherein the center comprises means for sending map data to the map editing-and-displaying apparatus on a requested acquisition unit basis, and wherein the map editing-and-displaying apparatus comprises map data storing means for storing map data, map data acquiring means for acquiring partial map data from the center, map name assigning means for assigning a map name to the partial map data on the basis of index data that are appended to the partial map data, and requesting means for requesting a map including a certain prefecture or state, city or district, town or ward, or street. This configuration makes it possible to acquire map data on an area basis, more specifically, on a prefecture (or state) basis, a city (or district) basis, town basis or the like. This allows a user to easily acquire necessary map data without performing a complicated operation for determining an area.

BRIEF DESCRIPTION OF THE DRAWINGS

FIG. 4 is a flowchart showing a procedure for determining transmission map data in a map managing system according to a second embodiment of the invention.

DETAILED DESCRIPTION OF THE PREFERRED EMBODIMENTS

Embodiments of the present invention will be hereinafter described in detail with reference to FIGS. 1-4.

First Embodiment

A first embodiment of the invention is directed to a map editing-and-displaying apparatus that automatically assigns a map name to map data in accordance with the range of a map-data-acquired area in acquiring the map data on an area basis.

Figure 1:
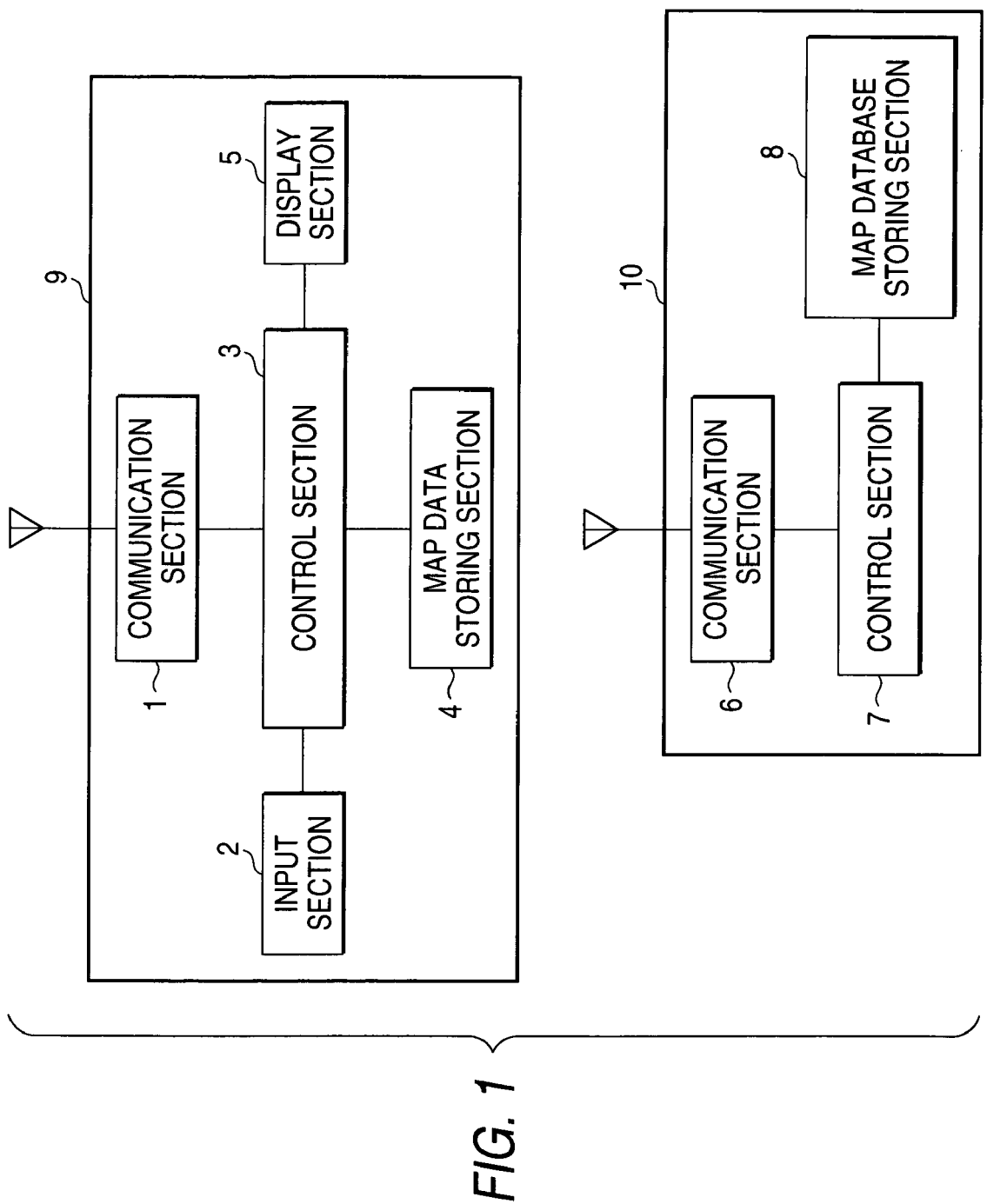
FIG. 1 is a block diagram showing the basic configurations of a map editing-and-displaying apparatus and a center according to a first embodiment of the present invention.

FIG. 1 is a functional block diagram showing the configurations of a map editing-and-displaying apparatus and a center according to the first embodiment of the invention. In FIG. 1, a communication section 1 is a means for receiving map data. An input section 2 is a means through which a user inputs a content of map editing. A control section 3 is a means for controlling the map editing-and-displaying apparatus 9. A map data storing section 4 is a rewritable recording device for storing map data. A display section 5 is a means for presenting a map data editing result to the user. The communication section 1, the input section 2, the control section 3, the map data storing section 4, and the display section 5 constitute the map editing-and-displaying apparatus 9.

A communication section 6 is a means for sending out requested map data. A control section 7 is a means for controlling the center 10. A map database storing section 8 is a rewritable recording device for storing a map database. The communication section 6, the control section 7, and the map database storing section 8 constitute the center 10. The map editing-and-displaying apparatus 9 and the center 10 constitute a map managing system.

Figure 2:
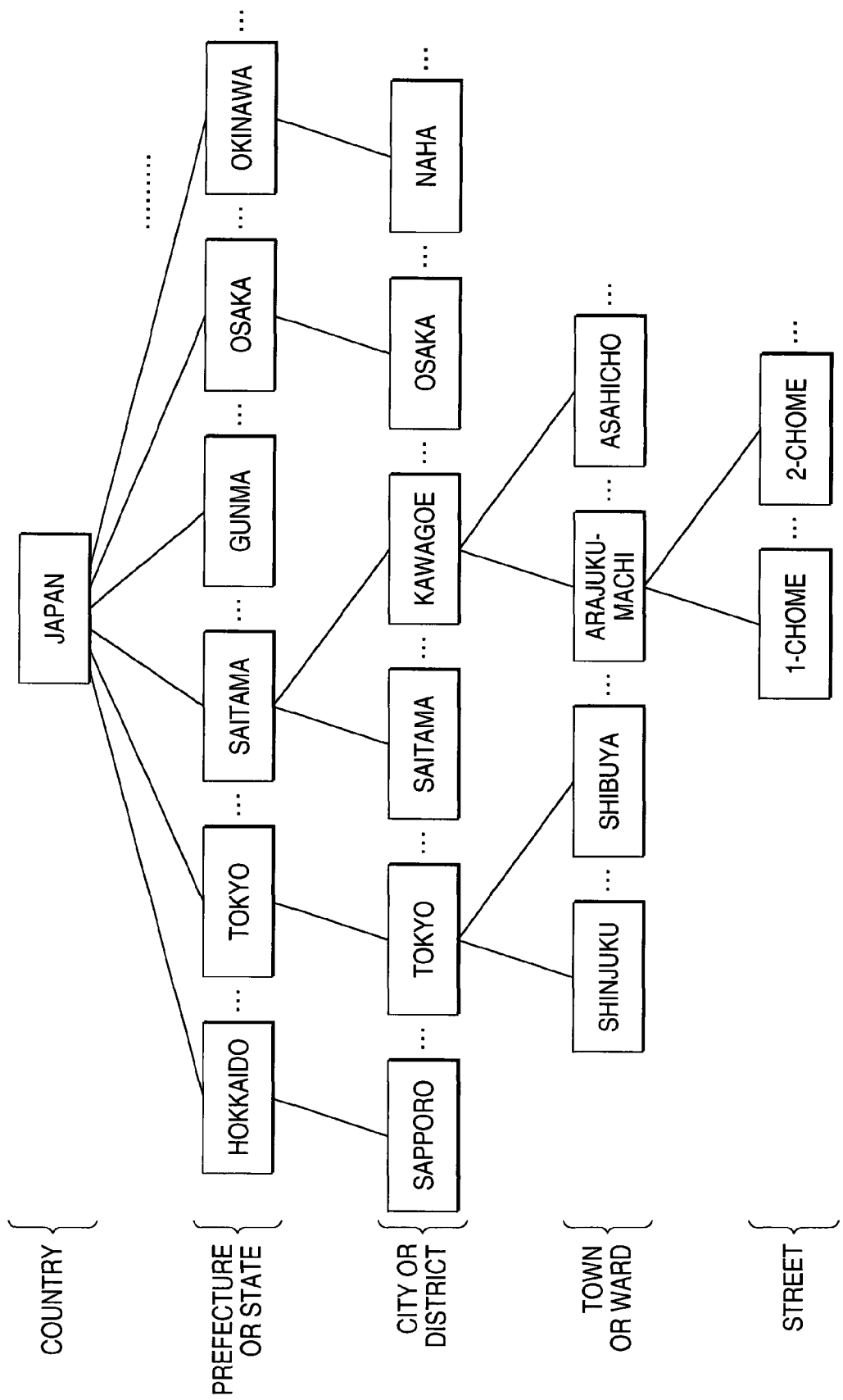
FIG. 2 shows address index data that are used in the map editing-and-displaying apparatus according to the first embodiment of the invention.

FIG. 2 shows map data address index data that are used in the map editing-and-displaying apparatus 9. As shown in FIG. 2, the address index data have a tree structure and are in many cases 4-layer data consisting of prefecture (or state) data, city (or district) data, town (or ward) data, and street data. If the address index data of the whole country have a complete tree structure, address index data of each of mesh areas should be partial tree data thereof. A map name is determined by utilizing this structure.

It is assumed that map data are in mesh (grid) form and that map data are added or updated on a mesh area basis. Various methods are available for acquisition of map data. In this embodiment, it is assumed that map data are acquired, by a radio communication, from the center 10 that has a latest map database. It is also assumed that it is possible to request the center 10 to send back map data of either one area or a plurality of areas, and that map data of one area or a plurality of areas that have been acquired by one request to the center 10 are handled as one acquisition unit. This embodiment is directed to a case that a map name is assigned to each acquisition unit.

Figure 3:
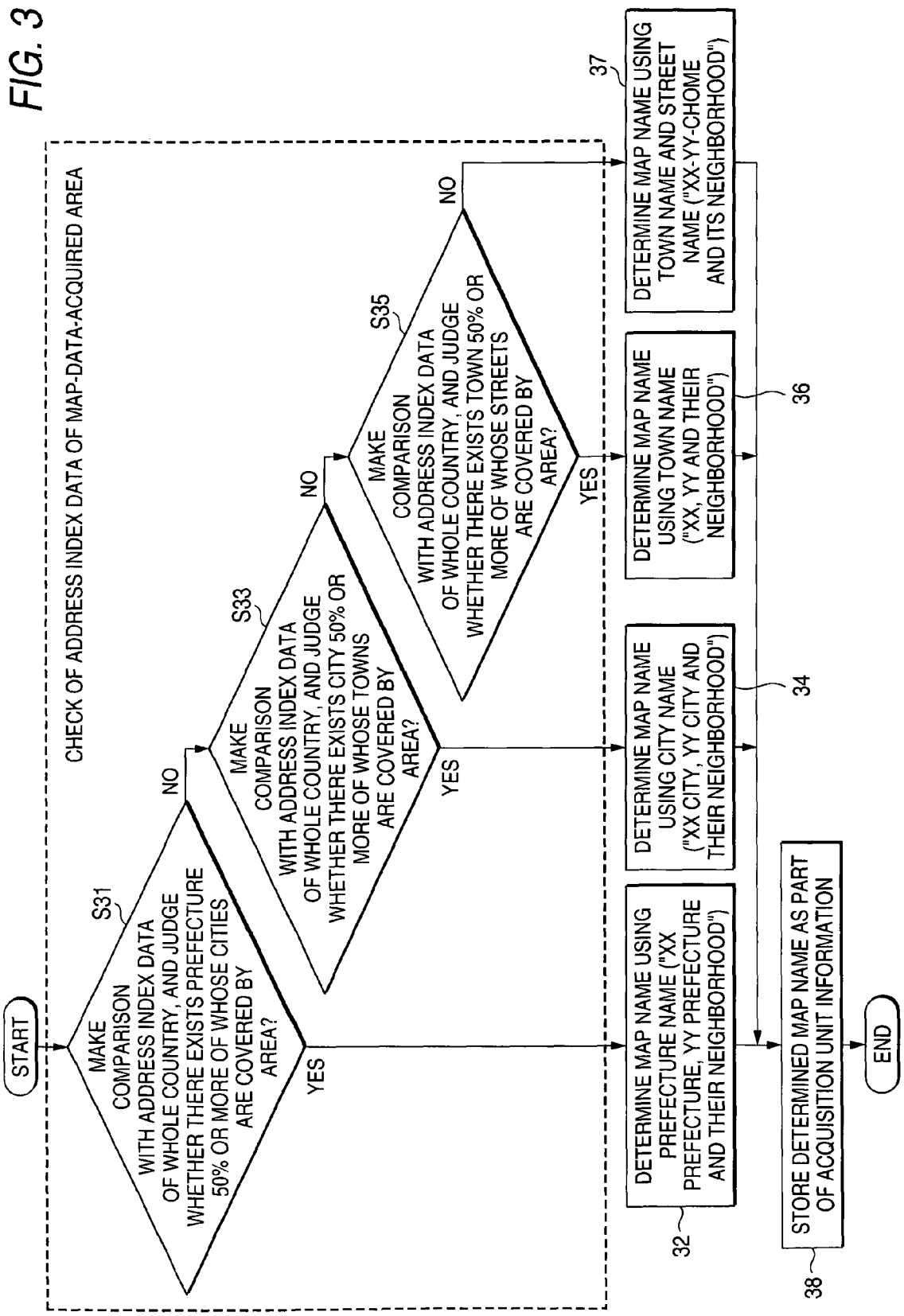
FIG. 3 is a flowchart showing a procedure for determining a map name in the map editing-and-displaying apparatus according to the first embodiment of the invention.

The operation of the above-configured map editing-and-displaying apparatus 9 according to the first embodiment of the invention will be described below. FIG. 3 is a flowchart showing a procedure for determining a map name in the map editing-and-displaying apparatus 9 according to the first embodiment of the invention. The map name assigning procedure will be described below with reference to the flowchart of FIG. 3. It is assumed that address index data of the whole country are recorded in the map data storing section 4, which is a rewritable recording device, of the map editing-and-displaying apparatus 9. It is also assumed that address index data are appended to acquired map data on a mesh area basis.

Prefectures (or state) of address index data contained in acquired map data of a certain area are checked and compared with the address index data of the whole country, whereby it is judged whether there exists a prefecture (or state) 50% or more of whose cities (or district) are covered by the map-data-acquired area (step 31). If such a prefecture (or state) exists, a map name is determined by using the name of that prefecture (or state) (step 32). If the map-data-acquired area covers a particularly large percentage of the cities of only a certain prefecture, for example, if the map-data-acquired area covers 90% or more of the cities of only SAITAMA Prefecture and does not cover 50% or more of those of any other prefecture, a map name "Saitama Prefecture and its neighborhood" is assigned to the map data. If the map-data-acquired area covers particularly large percentages of the cities of a plurality of prefectures, for example, if the map-data-acquired area covers 80% of the cities, towns, and villages of SAITAMA Prefecture and 70% of those of GUNMA Prefecture, a map name "Saitama Prefecture, Gunma Prefecture, and their neighborhood" is assigned to the map data.

If there exists no prefecture 50% or more of whose cities are covered by the map-data-acquired area, the cities (or district) of the address index data of the map-data-acquired area are checked and compared with the address index data of the whole country and it is judged whether there exists a city 50% or more of whose towns (or ward) are covered by the map-data-acquired area (step 33). If there exists such a city, a map name is determined by using the name of that city (step 34). If the map-data-acquired area covers a particularly large percentage of the towns (or ward) of a certain city, for example, if the map-data-acquired area covers 90% or more of the towns of Kawagoe city and does not cover 50% or more of those of any other city, a map name "Kawagoe city and its neighborhood" or "Kawagoe city, Saitama Prefecture and its neighborhood" is assigned to the map data. If the map-data-acquired area covers particularly large percentages of the towns of a plurality of cities, for example, if the map-data-acquired area covers 80% of the towns of Kawagoe city and 70% of those of Tsurugashima city, a map name "Kawagoe city, Tsurugashima city and their neighborhood" (begins with the name of the city with a larger percentage) is assigned to the map data.

If there exists no city 50% or more of whose towns are covered by the map-data-acquired area, the towns of the address index data of the map-data-acquired area are checked and compared with the address index data of the whole country and it is judged whether there exists a town 50% or more of whose streets are covered by the map-data-acquired area (step 35). If there exists such a town, a map name is determined by using the name of that town (step 36). If the map-data-acquired area covers a particularly large percentage of the streets of a certain town, for example, if the map-data-acquired area covers 90% or more of the streets of Arajukumachi of Kawagoe city and does not cover 50% or more of those of any other twon, a map name "Arajukumachi and its neighborhood" or "Arajukumachi, Kawagoe city and its neighborhood" is assigned to the map data. If the map-data-acquired area covers particularly large percentages of the streets of a plurality of towns, for example, if the map-data-acquired area covers 80% of the streets of Arajukumachi and 70% of those of Asahicho, a map name "Arajukumachi, Asahicho, and their neighborhood" is assigned to the map data.

If there exists no city 50% or more of whose towns are covered by the map-data-acquired area, a map name is determined by using the names of a town and a street (step 37). An arbitrary small village section is selected from the address index data of the map-data-acquired area. For example, a map name "Arajukumachi 1-chome and its neighborhood" is assigned to the map data. Upon determination of a map name, the determined map name is stored as part of acquisition unit information (step 38).

It is not always necessary to determine a map name according to the procedure of the flowchart of FIG. 3. If a character string that is suitable for a map name exists when map data are acquired, that character string may be used as a map name. For example, if a position has been determined on the basis of an index and map data of an area centered by that position have been acquired, a name used in the index search is used as a map name. More specifically, if Tokyo Disney Land has been searched for by using a facility index and map data of an area including it have been acquired, a map name "Tokyo Disney Land and its neighborhood" is assigned to the map data. If Saedocho in Kohoku ward has been searched for by using an address index and map data of an area including it have been acquired, a map name "Saedocho, Kohokuward and its neighborhood" is assigned to the map data. On the other hand, if a certain point on a map has been selected and map data of an area including that point have been acquired, the name of a facility near that point or an address of that point is employed as a map name. Although a map name is determined automatically by the above method, a user may change it to a name he likes.

In this embodiment, the map editing-and-displaying apparatus 9 assigns a map name to acquisition unit information. However, where map data are acquired from the center 10 having a latest map database, it is possible for the center 10 to assign a map name to map data and send it to the map editing-and-displaying apparatus 9 together with the map data. In this case, the map editing-and-displaying apparatus 9 stores a received map name as part of acquisition unit information. Where the center 10 assigns a map name to map data, it is not necessary to store address index data of the whole country in the map editing-and-displaying apparatus 9; the storage capacity can be reduced accordingly.

As described above, in the first embodiment of the invention, the map managing system is configured in such a manner that a map name is assigned automatically to map data in accordance with the range of a map-data-acquired area when the map data are acquired on an area basis. Therefore, a user can easily identify a map in a state that a list of maps being stored is displayed or in deleting the map.

Second Embodiment

A second embodiment of the invention is directed to a map managing system in which map data are acquired on an area basis, more specifically, on a prefecture basis, a city basis, or in a like manner, and map data of each acquisition unit are managed collectively. The basic configuration of the map managing system according to this embodiment is the same as that according to the first embodiment.

The map editing-and-displaying apparatus can request the center to send back map data of an area including a certain prefecture, a certain city, a certain town, or a certain street. For example, the map editing-and-displaying apparatus can send the center such a request as "we need a map of Saitama Prefecture," "we need maps of Kawagoe city and Tsurugashima city," or "we need a map of Arajukumachi 1-chome, Kawagoe city." The center sends the map editing-and-displaying apparatus map data, requested from the map editing-and-displaying apparatus, of all areas each including a prefecture, a city, a town or a street.

FIG. 4 is a flowchart showing a procedure for determining transmission map data in the map managing system according to the second embodiment of the invention. The operation of the map managing system will be described below with reference to FIG. 4.

A representative point of a requested area is incorporated into transmission map data (step 41). The representative point is a center point of a map that is displayed when a place name is searched for by using an address index. In the case of "Saitama Prefecture", for example, the representative point is the position of the Saitama prefectural offices. Address index data for the map data whose transmission has already been decided are generated (step 42).

It is judged whether the address index data of the transmission map data include all address index data of the requested area (step 43). This judgment is made by comparing the address index data of the transmission map data with the address index data of the whole country. For example, for a request "we need a map of Saitama Prefecture," an affirmative judgment result is obtained if the address index data of the transmission map data include all data that are lower than "Saitama Prefecture" in the layered structure in the address index data of the whole country. If the judgment result is affirmative, the process is finished.

If the judgment result is negative, the address index data of a region adjacent to the area for which transmission of the map data has already been decided is searched. If the address index data of the adjacent region include part of the address index data of the requested area, the map data of the adjacent region are added to the transmission map data (step 44). Steps 42-44 are executed repeatedly until the address index data of the transmission map data come to include all the address index data of the requested area. After completion of a communication, the map editing-and-displaying apparatus assigns, in the same manner as in the first embodiment, a map name in accordance with the range of the partial map data on the basis of the structure of the address index data that are appended to the map data.

In the second embodiment of the invention, the map managing system is configured in such a manner that map data are acquired on an area basis, more specifically, on a prefecture basis, a city basis, or a like manner, and map data of each acquisition unit are managed collectively. Therefore, a user can acquire necessary map data without the need for performing a complicated operation of determining an area. Since acquired map data do not include unnecessary map data, the amount of communication data can be reduced. Further, since map data of each acquisition unit are managed collectively, an unnecessary map can easily be deleted.

As is apparent from the above description, a map editing-and-displaying apparatus according to the invention comprises map data acquiring means for acquiring partial map data from a map database; map data storing means for storing map data; and map name assigning means for assigning a map name to the partial map data on the basis of index data that are appended to the partial map data. With this configuration, even a user who is not familiar with maps can easily recognize an area of acquired map data and time of their acquisition and can easily delete an unnecessary map.

Further, since map data can be acquired on an area basis, more specifically, on a prefecture basis, a city basis, or a like manner, a map editing-and-displaying apparatus can be realized that allows a user to acquire necessary map data without the need for performing a complicated operation of determining an area.

What is claimed is:

1. A map editing apparatus for editing partial map data acquired from a map database, the map editing apparatus comprising:
   a control section connected to a map data storing section which stores address index data of a whole country, wherein the map data storing section comprises a recording device, and
   wherein the address index data of the whole country has a tree structure, and includes name data of states, name data of cities which are children of each of the states, name data of towns which are children of each of the cities, and name data of streets which are children of each of the towns; and wherein the control section executes:

a checking process for checking the name data of cities related to the partial map data by using address index data appended to the partial map data;

an obtaining process for obtaining a number of cities included in the address index data appended to the partial map data per state, for each of the states corresponding to the name data of the cities obtained by the checking process, by using the address index data of the whole country and the name data of the cities obtained by the checking process;

an obtaining process for obtaining a total number of cities per state for each of the states by using the address index of the whole country; and an assigning process for assigning the name data of a state, in which a proportion of the number of the cities included in the address index appended to the partial map data per said state to the total number of the cities per said state is equal to or greater than a predetermined ratio, to the partial map data.

2. A map editing apparatus for editing partial map data acquired from a map database, the map editing apparatus comprising:

a control section connected to a map data storing section which stores address index data of a whole country, wherein the map data storing section comprises a recording device, and wherein the address index data of the whole country has a tree structure, and includes name data of states, name data of cities which are children of each of the states, name data of towns which are children of each of the cities, and name data of streets which are children of each of the towns; and wherein the control section executes:

a checking process for checking the name data of towns related to the partial map data by using address index data appended to the partial map data;

an obtaining process for obtaining a number of towns included in the address index data appended to the partial map data per city, for each of the cities corresponding to the name data of the towns obtained by the checking process, by using the address index data of the whole country and the name data of the towns obtained by the checking process;

an obtaining process for obtaining a total number of towns per city for each of the cities by using the address index of the whole country; and an assigning process for assigning the name data of a city, in which a proportion of the number of the towns included in the address index appended to the partial map data per said city to the total number of the towns per said city is equal to or greater than a predetermined ratio, to the partial map data.

3. A map editing apparatus for editing partial map data acquired from a map database, the map editing apparatus comprising:

a control section connected to a map data storing section which stores address index data of a whole country, wherein the map data storing section comprises a recording device, and wherein the address index data of the whole country has a tree structure, and includes name data of states, name data of cities which are children of each of the states, name data of towns which are children of each of the cities, and name data of streets which are children of each of the towns; and wherein the control section executes:

a checking process for checking the name data of streets related to the partial map data by using address index data appended to the partial map data;

an obtaining process for obtaining a number of streets included in the address index data appended in the partial map per town, for each of the towns corresponding to the name data of the streets obtained by the checking process, by using the address index data of the whole country and the name data of the streets obtained by the checking process;

an obtaining process for obtaining a total number of streets per town for each of the towns by using the address index of the whole country; and an assigning process for assigning the name data of a town, in which a proportion of the number of the streets included in the address index appended to the partial map data per said town to the total number of the streets per said town is equal to or greater than a predetermined ratio, to the partial map data.

\* \* \* \* \*

UNITED STATES PATENT AND TRADEMARK OFFICE
CERTIFICATE OF CORRECTION

| | | |
|---|---|---|
| PATENT NO. | : 7,647,341 B2 | Page 1 of 1 |
| APPLICATION NO. | : 10/423639 | |
| DATED | : January 12, 2010 | |
| INVENTOR(S) | : Yasuo Ojima | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Sixteenth Day of November, 2010

David J. Kappos
*Director of the United States Patent and Trademark Office*